(12) United States Patent
Haynes et al.

(10) Patent No.: US 11,192,658 B2
(45) Date of Patent: Dec. 7, 2021

(54) EVACUATION SLIDE RAMP BARRIER READINESS INDICATOR

(71) Applicant: GOODRICH CORPORATION, Charlotte, NC (US)

(72) Inventors: Timothy C. Haynes, Prescott Valley, AZ (US); Drew Hartman, Phoenix, AZ (US); Ryan Schmidt, Gilbert, AZ (US)

(73) Assignee: Goodrich Corporation, Charlotte, NC (US)

( * ) Notice: Subject to any disclaimer, the term of this patent is extended or adjusted under 35 U.S.C. 154(b) by 117 days.

(21) Appl. No.: 16/746,172

(22) Filed: Jan. 17, 2020

(65) Prior Publication Data
US 2021/0221524 A1    Jul. 22, 2021

(51) Int. Cl.
*B64D 25/14*    (2006.01)

(52) U.S. Cl.
CPC .................................. *B64D 25/14* (2013.01)

(58) Field of Classification Search
CPC ......................................................... B64D 25/14
See application file for complete search history.

(56) References Cited

U.S. PATENT DOCUMENTS

| | | | | |
|---|---|---|---|---|
| 4,333,546 A | * | 6/1982 | Fisher | B64D 25/14 182/48 |
| 4,846,422 A | * | 7/1989 | Fisher | B64D 25/14 244/137.2 |
| 6,443,259 B1 | * | 9/2002 | Oney | B64D 25/14 182/18 |
| 9,309,002 B2 | * | 4/2016 | Fellmann | B64D 25/14 |
| 2015/0097083 A1 | * | 4/2015 | Fellmann | B64D 25/14 244/137.2 |
| 2021/0086870 A1 | * | 3/2021 | Haynes | B63C 9/04 |
| 2021/0094693 A1 | * | 4/2021 | Haynes | A62B 1/20 |

* cited by examiner

*Primary Examiner* — Philip J Bonzell
*Assistant Examiner* — Tye William Abell
(74) *Attorney, Agent, or Firm* — Snell & Wilmer L.L.P.

(57) ABSTRACT

An inflatable slide may comprise a ramp portion and a slide portion having a head end attached to the ramp portion and a toe end opposite the head end. A ramp barrier readiness indicator may include a bendable portion located proximate the head end of the slide portion. The ramp barrier readiness indicator may be configured to pivot between a raised position and a lowered position in response to inflation of the slide portion.

17 Claims, 5 Drawing Sheets

EVACUATION SLIDE RAMP BARRIER READINESS INDICATOR

FIELD

The present disclosure relates to aircraft evacuation systems and, in particular, to a ramp barrier readiness indicator for an evacuation slide.

BACKGROUND

Emergency evacuation systems, including inflatable evacuation slides, may be used to exit an aircraft absent a jet way or other suitable means of egress for passengers. The evacuation slides may deploy, for example, from the side of an aircraft fuselage. In the event of a water landing, the inflatable evacuation slide may be employed as a life raft. Evacuation systems may also deploy from the side of an aircraft fuselage, for example, or from over a wing of the aircraft, i.e., "off-wing." Off-wing evacuation systems may include a readiness indicator, which indicates to evacuees whether the slide is fully deployed and/or in a position to safely covey evacuees to an exit surface. Current readiness indicators may inflate during slide inflation. However, the readiness indicators can be difficult to see and/or understand, and may be ineffective in high winds.

SUMMARY

An inflatable slide is disclosed herein. In accordance with various embodiments, the inflatable slide may comprise a ramp portion, a slide portion comprising a head end attached to the ramp portion and a toe end opposite the head end, and a ramp barrier readiness indicator including a bendable portion located proximate the head end of the slide portion. The ramp barrier readiness indicator may be configured to pivot between a raised position and a lowered position in response to inflation of the slide portion.

In various embodiments, the ramp barrier readiness indicator may be inflatable. In various embodiments, an inflatable rail may define, at least, a portion of the ramp portion. An entry end of the ramp barrier readiness indicator may pivot relative to the inflatable rail.

In various embodiments, a strap may be detachably coupled between the entry end of the ramp barrier readiness indicator and the toe end of the slide portion. In various embodiments, a releasable restraint may couple the toe end to a sliding surface of the slide portion. In various embodiments, the strap may be detachably coupled to the releasable restraint.

In various embodiments, a releasable connection may couple the strap to the toe end of the slide portion. In various embodiments, the ramp barrier readiness indicator may be configured to pivot from the raised position to the lowered position, in response to the strap decoupling from the toe end.

An off-wing evacuation system is also disclosed herein. In accordance with various embodiments, the off-wing evacuation system may comprise an inflatable slide and an inflation source fluidly coupled to the inflatable slide. The inflatable slide may include a ramp portion, a slide portion comprising a head end attached to the ramp portion and a toe end opposite the head end, and a ramp barrier readiness indicator attached to the head end of the slide portion. The ramp barrier readiness indicator may be configured to pivot between a raised position and a lowered position.

In various embodiments, the ramp barrier readiness indicator may be fluidly coupled to an inflatable rail defining, at least, a portion of the ramp portion of the inflatable slide. In various embodiments, the ramp barrier readiness indicator may pivot relative to the inflatable rail.

In various embodiments, the inflatable slide may further comprise a strap detachably coupled between an entry end of the ramp barrier readiness indicator and the toe end of the slide portion. In various embodiments, a releasable restraint may couple the toe end to a sliding surface of the slide portion. In various embodiments, the strap may be detachably coupled to the releasable restraint.

In various embodiments, a releasable connection may couple the strap to the toe end of the slide portion. In various embodiments, the releasable connection may comprise at least one of a thread system, tape, a snap, or hook and loop fasteners.

A ramp portion of an inflatable slide is also disclosed herein. In accordance with various embodiments, the ramp portion may comprise a first hand rail, a second hand rail located opposite the first hand rail, an inflatable rail, and a ramp barrier readiness indicator in fluid communication with the inflatable rail and configured to pivot between a raised position and a lowered position.

In various embodiments, in the lowered position, the ramp barrier readiness indicator may be generally parallel to the inflatable rail. In various embodiments, a strap may be attached to an entry end of the ramp barrier readiness indicator.

In various embodiments, the ramp barrier readiness indicator may include a bendable portion opposite the entry end.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option.

Throughout the present disclosure, like reference numbers denote like elements. Accordingly, elements with like element numbering may be shown in the figures, but may not be necessarily repeated herein for the sake of clarity. As used herein, "proximate" refers to a direction towards or a location close and/or adjacent to the reference component.

Figure 1A:
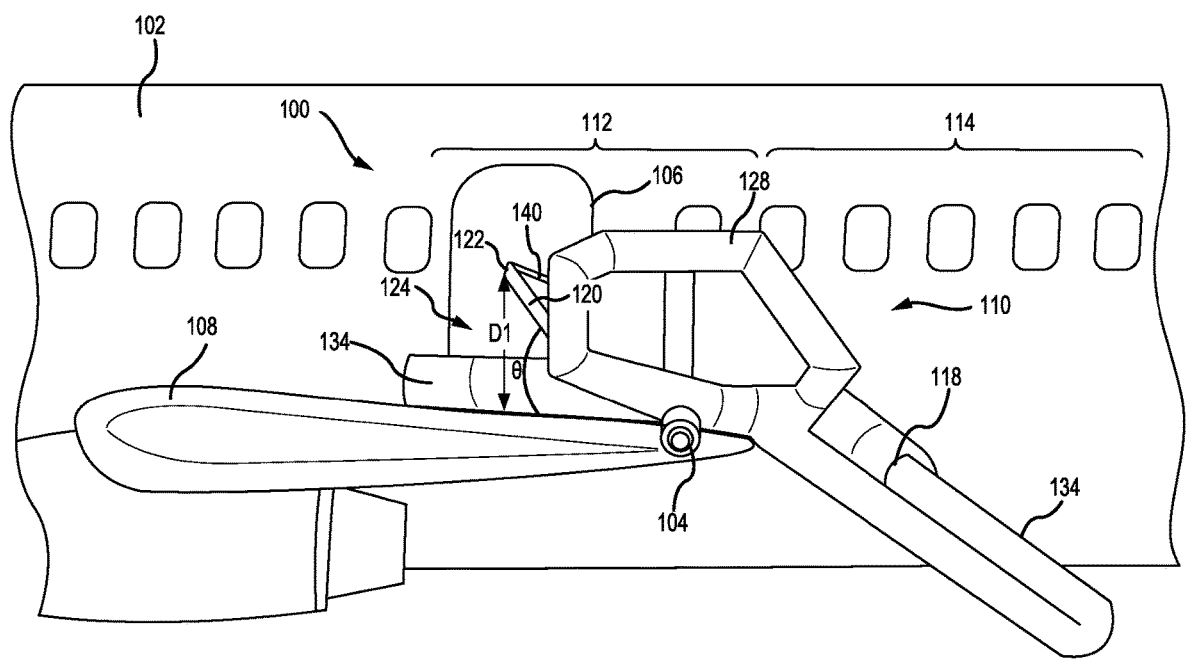
FIGS. 1A and 1B illustrate an off-wing evacuation system in a partially deployed state with a ramp barrier readiness indicator in a raised position, in accordance with various embodiments.
Figure 1B:
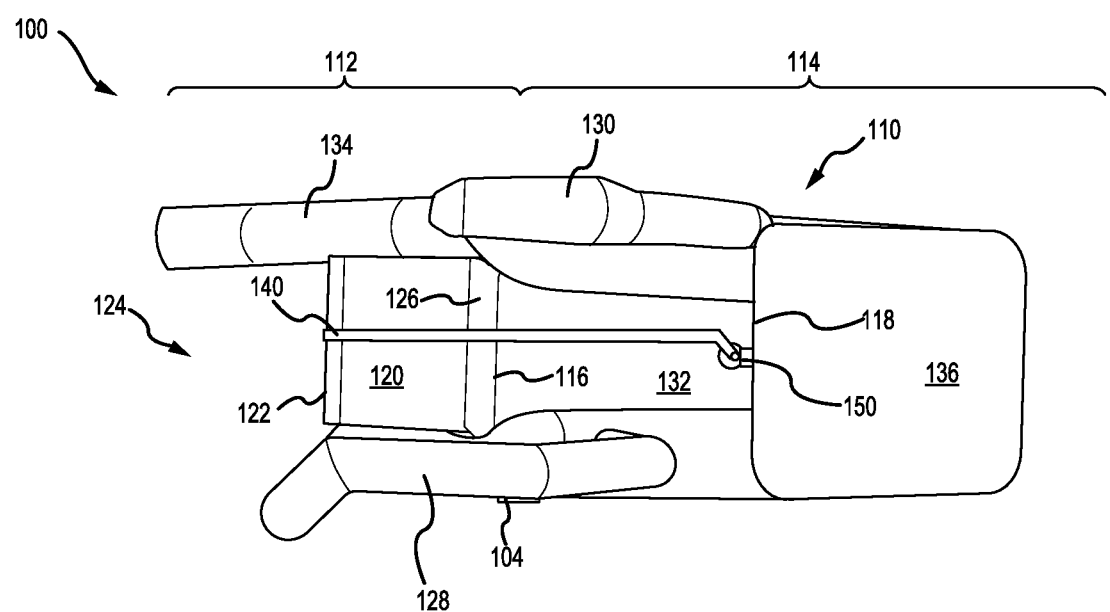

With reference to FIG. 1A, an off-wing evacuation system 100 including an inflatable slide 110 is illustrated. In FIGS. 1A and 1B, inflatable slide 110 is shown in a partially deployed state. In accordance with various embodiments, inflatable slide 110 may deploy from an aircraft 102. According to various embodiments, inflatable slide 110 may be used for emergency evacuation of aircraft 102 and may be configured to pack within a compartment of the aircraft 102 (e.g., in an aircraft door, a slide bustle, etc.). Inflatable slide 110 may be positioned near an exit door 106 of aircraft 102. In various embodiments, exit door 106 may be located over a wing 108 of aircraft 102. In the event of an emergency, exit door 106 may be opened by a passenger or crew member of aircraft 102. Inflatable slide 110 may deploy in response to the passenger or crew member opening exit door 106. In various embodiments, inflatable slide 110 may deploy in response to another action taken by the passenger or crew member such as, for example, depression of a button or actuation of a lever.

Off-wing evacuation system 100 may include an inflation source 104 fluidly coupled to inflatable slide 110 and configured to inflate the inflatable slide 110. Inflation source 104 may include one or more compressed fluid sources, which may include a compressed gas tank, an inflation cylinder, pyrotechnic apparatus, or other suitable inflation device. Upon deployment, inflation source 104 may deliver a pressurized fluid (such as in a gaseous state) to fill inflatable slide 110 with the pressurized fluid. In response to receiving the pressurized fluid, inflatable slide 110 may begin to inflate.

Inflatable slide 110 may comprise a ramp portion 112 and a slide portion 114. Ramp portion 112 may be secured to aircraft 102, such as by a girt. Ramp portion 112 may extend across a portion of wing 108 to allow evacuees to walk, or traverse, across wing 108 to access slide portion 114 of inflatable slide 110. In this regard, evacuees may exit aircraft 102 onto wing 108, enter and walk across ramp portion 112, and then slide down the slide portion 114 to an exit surface.

In various embodiments, slide portion 114 may extend from ramp portion 112 and generally slope downward toward an exit surface. Slide portion 114 may comprise a head end 116 and toe end 118. Head end 116 of slide portion 114 may be coupled to or integral with ramp portion 112. In FIG. 1A, toe end 118 is partially deployed (i.e., not fully extended). In various embodiments, inflatable slide 110 may be folded when stowed. Upon deployment of inflatable slide 110, inflation source 104 may deliver pressurized fluid to inflatable slide 110, thereby causing inflatable slide 110 to unfold. It may be unsafe for evacuees to enter slide portion 114 prior to slide portion 114 fully deploying.

In accordance with various embodiments, inflatable slide 110 includes a ramp barrier readiness indicator 120. In FIGS. 1A and 1B, ramp barrier readiness indicator 120 is in a raised, or blocking, position. In the raised position, an entry end 122 of ramp barrier readiness indicator 120 is raised relative to wing 108. Stated differently, entry end 122 is located a distance D1 from wing 108. In the raised position, an angle theta ($\theta$) formed by ramp barrier readiness indicator 120 and wing 108 is greater than 0°. For example, in various embodiments, angle theta ($\theta$) is greater than 15°, greater than 30°, and/or between 45° and 90°.

With reference to FIG. 1B, a plan view of inflatable slide 110 in the partially deployed state with ramp barrier readiness indicator 120 in the raised position is illustrated. Ramp barrier readiness indicator 120 may be located between a first hand rail 128 and a second hand rail 130 in ramp portion 112. First and second hand rails 128, 130 may be located on opposing sides of ramp portion 112. Ramp barrier readiness indicator 120 may extend from head end 116 of slide portion 114. Ramp barrier readiness indicator 120 is located between head end 116 and an entrance 124 to ramp portion 112. Entrance 124 of ramp portion 112 is located generally opposite head end 116, such that evacuees enter ramp portion 112 through entrance 124. In the raised position, ramp barrier readiness indicator 120 may block evacuees from entering slide portion 114. In this regard, in the raised position, ramp barrier readiness indicator 120 is configured to inform evacuees that slide portion 114 is not fully deployed and should not be entered.

In various embodiments, entry end 122 of ramp barrier readiness indicator 120 is opposite a bendable portion 126 of ramp barrier readiness indicator 120. Ramp barrier readiness indicator 120 may be configured to pivot at bendable portion 126. Bendable portion 126 is located proximate head end 116 of slide portion 114. In various embodiments, ramp barrier readiness indicator 120 may comprise an inflatable structure. Ramp barrier readiness indicator 120 may be fluidly coupled to inflatable slide 110, such that ramp barrier readiness indicator 120 inflates simultaneously, or nearly simultaneously, with inflatable slide 110. For example, ramp barrier readiness indicator 120 may be in fluid communication with an inflatable rail 134 of inflatable slide 110. Inflatable rail 134 may define, at least, a portion of ramp portion 112. In various embodiments, inflatable rail 134 may be located on wing 108, with momentary reference to FIG. 1A. Ramp barrier readiness indicator 120 may pivot relative to inflatable rail 134. In various embodiments, inflatable rail 134 may extend into slide portion 114, such that inflatable rail 134 defines, at least, a portion of a sliding surface 132 of slide portion 114. Sliding surface 132 extends from head end 116 to toe end 118.

In various embodiments, a strap 140 my secure and/or maintain ramp barrier readiness indicator 120 in the raised position, until inflatable slide 110 fully inflates (i.e., until toe end 118 translates to a fully extended position). Strap 140 may be detachably coupled to toe end 118 of slide portion 114. In various embodiments, strap 140 is attached to toe end 118 via a releasable restraint 150. Releasable restraint 150 may aid in maintaining inflatable slide 110 in a folded position and/or in the staged deployment of inflatable slide 110. In accordance with various embodiments, inflatable slide 110 may unfold and/or translate to a fully deployed state in response to separation of releasable restraint 150. In various embodiments, releasable restraint 150 may be coupled to sliding surface 132 and an underside surface 136 of slide portion 114. Underside surface 136 is opposite sliding surface 132.

In various embodiments, releasable restraint 150 may be configured to separate in response to an internal pressure of inflatable slide 110 exceeding a threshold pressure. For example, inflation source 104 may supply a flow of pressurized fluid to inflatable slide 110 in response to deployment of inflatable slide 110. Inflatable slide 110 may begin to inflate and an internal pressure of inflatable slide 110 may increase. Releasable restraint 150 may maintain inflatable slide 110 in the folded, or partially deployed, state until the internal pressure has increased to greater than a predetermined threshold pressure. Releasable restraint 150 may separate in response to the internal pressure of inflatable slide 110 being greater than the predetermined threshold pressure. Inflatable slide 110 translates to the fully deployed state (FIGS. 2A and 2B) response to releasable restraint 150 separating.

Strap 140 may be coupled between entry end 122 of ramp barrier readiness indicator 120 and releasable restraint 150. The length of strap 140 is selected such that, when strap 140 is attached to releasable restraint 150, ramp barrier readiness indicator 120 is in the raised position. Strap 140 may be coupled to releasable restraint 150 such that strap 140 separates from releasable restraint 150 in response to releasable restraint 150 separating. In this regard, strap 140 may be coupled to releasable restraint 150 such that strap separates from toe end 118, in response to separation of releasable restraint 150 (i.e., in response to toe end 118 translating to the fully deployed state as shown FIGS. 2A and 2B). In various embodiments, strap 140 may be releasably coupled directly to toe end 118. For example, with reference to FIG. 3, releasable restraint 150 may couple toe end 118 to sliding surface 132 and a releasable connection 152 (e.g., tape, one or more snaps, hook and loop fasteners, a breakable thread system, or any other releasable fastening system) may couple strap 140 to toe end 118. A first portion of releasable connection 152 attached to strap 140 may be configured to separate, or decouple, from a second portion of releasable connection 152 attached to toe end 118, in response to separation of releasable restraint 150 and translation of toe end 118 to the fully extended position (i.e., in response to the force generated by the internal pressure within slide portion 114 exceeding a threshold pressure). Stated differently, releasable connection 152 may disengage, or uncouple, in response to the force imparted by toe end 118 onto releasable connection 152 exceeding a threshold force. In the case of a thread system, the thread system may be stitched in a manner such that the force imparted by toe end 118 onto the thread system may undo and/or break the stitching of the thread system. In this regard, strap 140 may decouple from toe end 118 in response to releasable connection 152 separating.

Figure 2A:
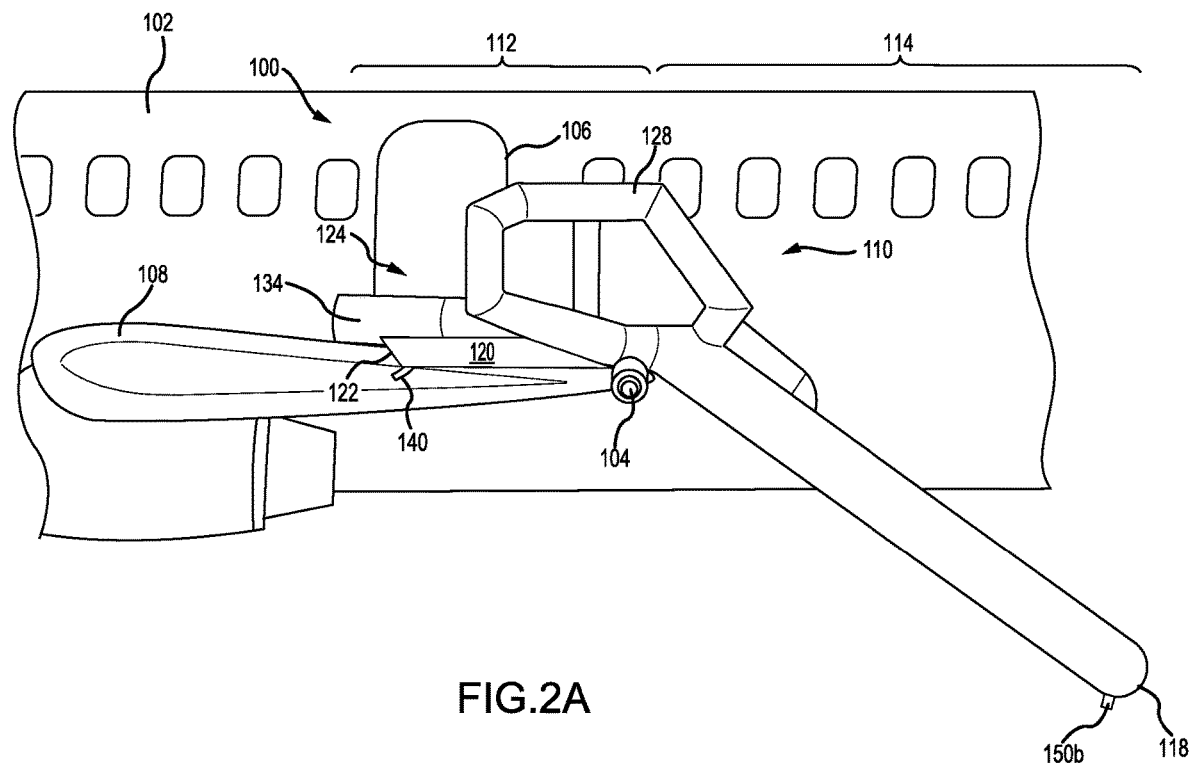
FIGS. 2A and 2B illustrate an off-wing evacuation system in a fully deployed state with a ramp barrier readiness indicator in lowered position, in accordance with various embodiments.
Figure 2B:
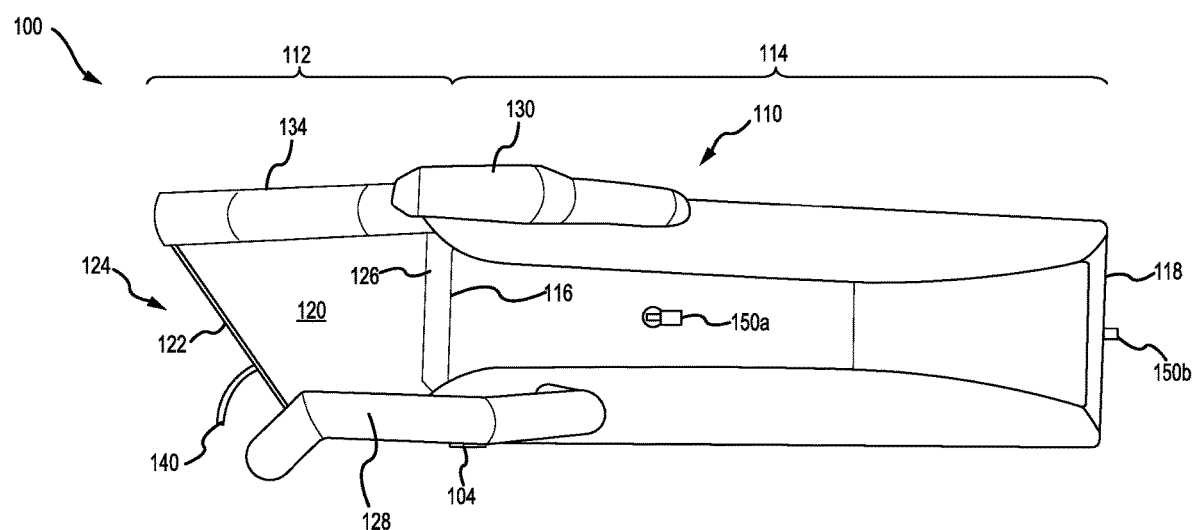
Figure 3:
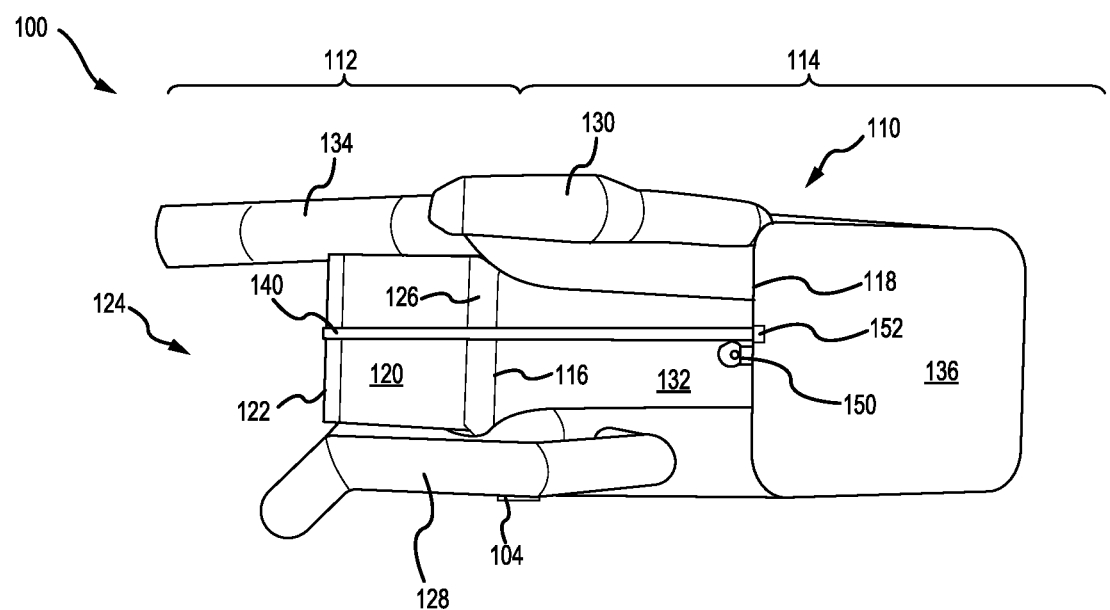
FIG. 3 illustrates an inflatable slide in a partially deployed state with a ramp barrier readiness indicator in a raised position and a releasable connection coupling a strap to a toe end of the inflatable slide, in accordance with various embodiments.

FIGS. 2A and 2B illustrate slide portion 114 in the fully deployed state and ramp barrier readiness indicator 120 in the lowered position. Slide portion 114 translates to the fully deployed state, in response to first releasable restraint portion 150a disconnecting (i.e., separating) from second releasable restraint portion 150b. The separation of first releasable restraint portion 150a from second releasable restraint portion 150b releases strap 140 from toe end 118, thereby allowing ramp barrier readiness indicator 120 to pivot to the lowered position. In the fully deployed state, toe end 118 may contact the exit surface. The exit surface may be, for example, a runway, water, uneven terrain, or any other surface.

In accordance with various embodiments, in response to strap 140 decoupling from toe end 118, entry end 122 of ramp barrier readiness indicator 120 pivots toward wing 108, decreasing angle theta ($\theta$) (FIG. 1A). In the lowered position, ramp barrier readiness indicator 120 may be located on and/or in contact with wing 108. In the lowered position, entry end 122 of ramp barrier readiness indicator 120 may contact and/or may be located adjacent to inflatable rail 134. In various embodiments, in the lowered position, ramp barrier readiness indicator 120 may be generally parallel to the portion of inflatable rail 134 located in ramp portion 112. Stated differently, in the lowered position, ramp barrier readiness indicator 120 may be generally parallel to the portion of inflatable rail 134 extending between bendable portion 126 and entry end 122 of ramp barrier readiness indicator 120. In the previous context, "generally parallel" mean±10° from parallel.

Decoupling strap 140 from toe end 118 allows ramp barrier readiness indicator 120 to translate to the lowered position. In this regard, when inflatable slide 110 is in the fully deployed state, ramp barrier readiness indicator 120 is in the lowered position, which allows evacuees to walk on ramp barrier readiness indicator 120 to access slide portion 114. Translating ramp barrier readiness indicator 120 to the lowered position may also allow evacuees to determine by looking at ramp barrier readiness indicator 120 whether the slide portion 114 is sufficiently inflated and fully extended so that evacuees may safely enter slide portion 114. In this regard, ramp barrier readiness indicator 120 is configured to indicate a deployment status of the inflatable slide 110 (i.e., whether slide portion 114 is a position to safely evacuate passengers) and to obstruct and/or deter evacuees from entering slide portion 114 prior to inflatable slide 110 reaching full deployment and/or sufficient inflation.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic.

Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inflatable slide, comprising:
   a ramp portion including an inflatable rail defining, at least, a portion of the ramp portion;
   a slide portion comprising a head end attached to the ramp portion and a toe end opposite the head end;
   a ramp barrier readiness indicator including a bendable portion located proximate the head end of the slide portion, wherein the ramp barrier readiness indicator is configured to pivot between a raised position and a lowered position in response to inflation of the slide portion, and wherein an entry end of the ramp barrier readiness indicator pivots relative to the inflatable rail; and
   a strap detachably coupled between the entry end of the ramp barrier readiness indicator and the toe end of the slide portion, wherein the ramp barrier readiness indicator is configured to pivot from the raised position to the lowered position in response to the strap decoupling from the toe end.

2. The inflatable slide of claim 1, wherein the ramp barrier readiness indicator is inflatable.

3. The inflatable slide of claim 1, further comprising a releasable restraint coupling the toe end to a sliding surface of the slide portion.

4. The inflatable slide of claim 3, wherein the strap is detachably coupled to the releasable restraint.

5. The inflatable slide of claim 3, further comprising a releasable connection coupling the strap to the toe end of the slide portion.

6. An off-wing evacuation system, comprising:
   an inflatable slide including:
      a ramp portion;
      a slide portion comprising a head end attached to the ramp portion and a toe end opposite the head end; and
      a ramp barrier readiness indicator attached to the head end of the slide portion, wherein the ramp barrier readiness indicator is configured to pivot between a raised position and a lowered position, and wherein in the lowered position an entry end of the ramp barrier readiness indicator forms an entrance of the ramp portion; and
   an inflation source fluidly coupled to the inflatable slide.

7. The off-wing evacuation system of claim 6, wherein the ramp barrier readiness indicator is fluidly coupled to an inflatable rail defining, at least, a portion of the ramp portion of the inflatable slide.

8. The off-wing evacuation system of claim 7, wherein the ramp barrier readiness indicator pivots relative to the inflatable rail.

9. The off-wing evacuation system of claim 8, wherein the inflatable slide further comprises a strap detachably coupled between the entry end of the ramp barrier readiness indicator and the toe end of the slide portion.

10. The off-wing evacuation system of claim 9, further comprising a releasable restraint coupling the toe end to a sliding surface of the slide portion.

11. The off-wing evacuation system of claim 10, wherein the strap is detachably coupled to the releasable restraint.

12. The off-wing evacuation system of claim 10, further comprising a releasable connection coupling the strap to the toe end of the slide portion.

13. The off-wing evacuation system of claim 12, wherein the releasable connection comprises at least one of a thread system, tape, a snap, or hook and loop fasteners.

14. A ramp portion of an inflatable slide, the ramp portion comprising:
   a first hand rail;
   a second hand rail located opposite the first hand rail;
   an inflatable rail; and
   a ramp barrier readiness indicator located between the first hand rail and the second hand rail, the ramp barrier readiness indicator including an entry end and a bendable portion opposite the entry end, wherein the ramp barrier readiness indicator is configured to pivot between a raised position and a lowered position, and wherein in the lowered position the entry end of the ramp barrier readiness indicator forms an entrance to the ramp portion.

15. The ramp portion of claim 14, wherein in the lowered position the ramp barrier readiness indicator is generally parallel to the inflatable rail.

16. The ramp portion of claim 15, further comprising a strap attached to the entry end of the ramp barrier readiness indicator.

17. The ramp portion of claim 15, wherein in the raised position the entry end of the ramp barrier readiness indicator is located above the inflatable rail.

* * * * *